No. 698,260. Patented Apr. 22, 1902.
A. C. CREHORE & G. O. SQUIER.
ART OF TRANSMITTING INTELLIGENCE.
(Application filed Nov. 9, 1896.)
(No Model.) 2 Sheets—Sheet 1.
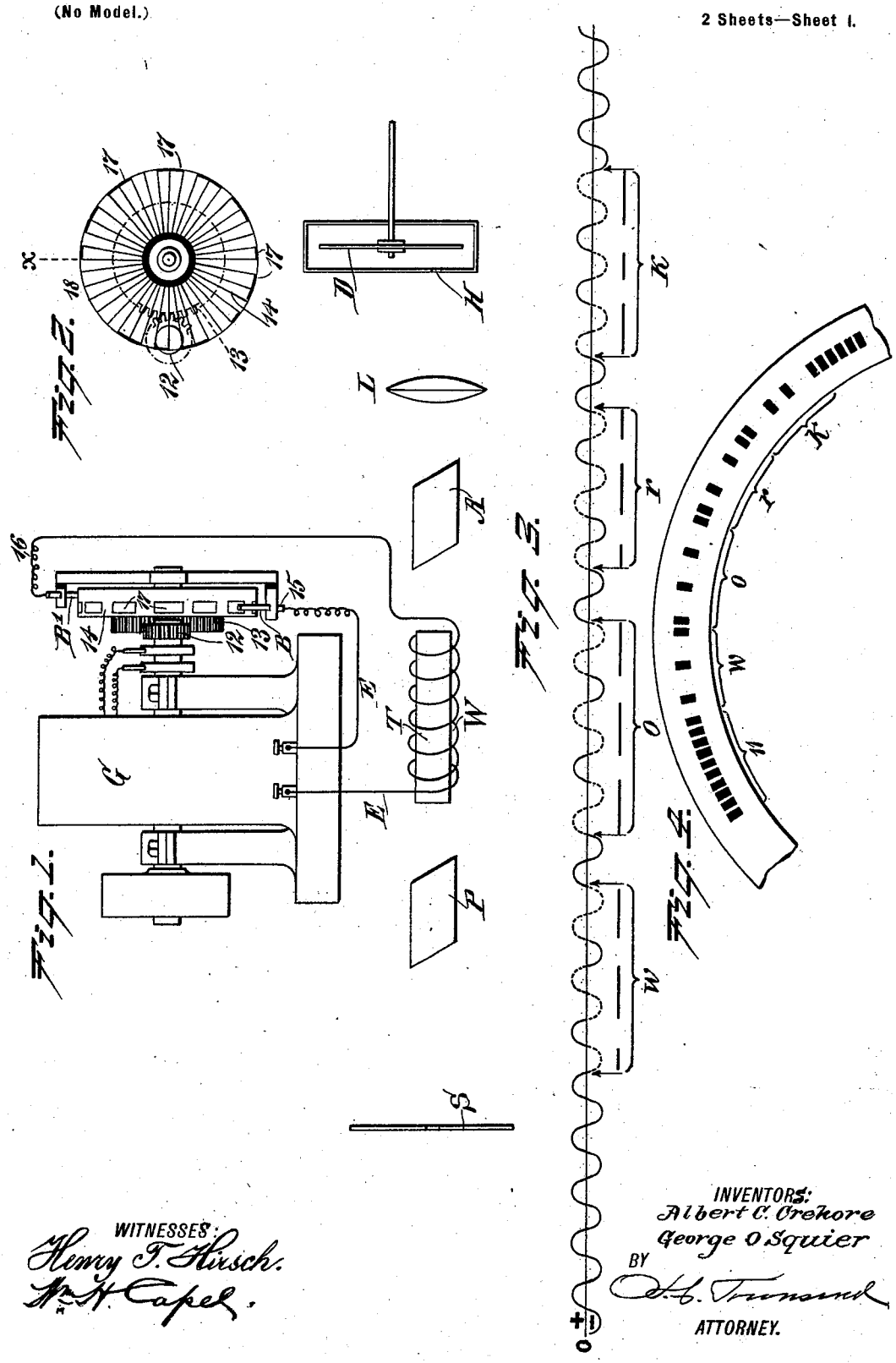
INVENTORS:
Albert C. Crehore
George O. Squier
BY
ATTORNEY.
WITNESSES:

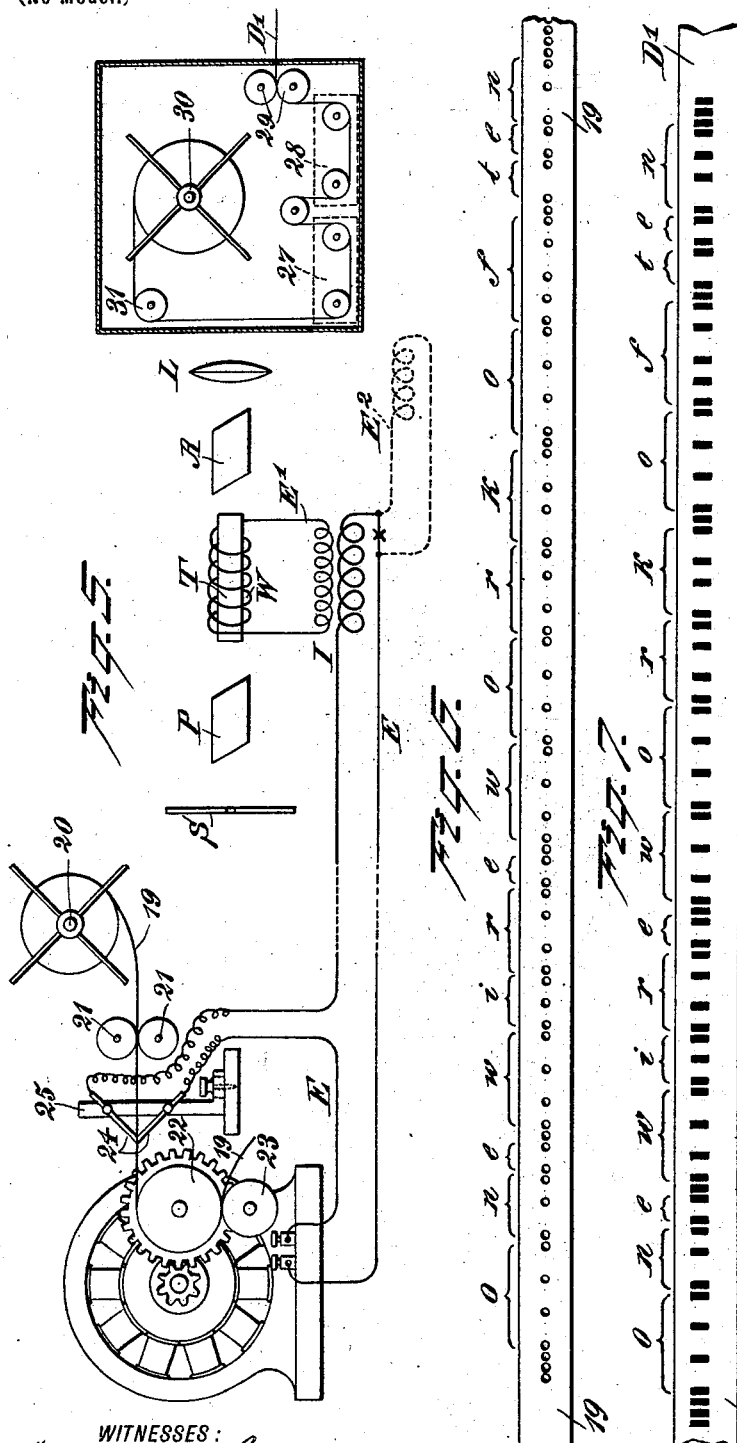

UNITED STATES PATENT OFFICE.

ALBERT C. CREHORE, OF HANOVER, NEW HAMPSHIRE, AND GEORGE O. SQUIER, OF FORT MONROE, VIRGINIA, ASSIGNORS TO THE CREHORE-SQUIER INTELLIGENCE TRANSMISSION COMPANY, OF CLEVELAND, OHIO, A CORPORATION OF OHIO.

ART OF TRANSMITTING INTELLIGENCE.

SPECIFICATION forming part of Letters Patent No. 698,260, dated April 22, 1902.

Application filed November 9, 1896. Serial No. 611,576. (No model.)

*To all whom it may concern:*

Be it known that we, ALBERT C. CREHORE, a resident of Hanover, in the county of Grafton and State of New Hampshire, and GEORGE O. SQUIER, a resident of Fort Monroe, in the county of Elizabeth City and State of Virginia, citizens of the United States, have invented a certain new and useful Improvement in the Art of Transmitting Intelligence, of which the following is a specification.

This invention relates to a method of and apparatus for transmitting intelligence over an electric circuit, and is designed to diminish the disturbances and mutilations of the signals hitherto experienced in telegraphy and which are important factors in limiting the speed of transmission.

The invention consists, substantially, in impressing the characters of any desired code upon an alternating electric current by systematically cutting out or suppressing definite pulses of said current in predetermined order or relation, according to the code selected, by opening and closing the circuit over which said current flows at instants when the current is naturally zero and in making at the receiving end of the line a suitable visual record of the varying current, from which record the order or relation of the suppressed or the transmitted pulses may be observed and which may be therefore read according to the selected code.

The invention consists also in the combination, with means for generating alternating current, of a synchronously-operating transmitter having a prepared tape or sheet (preferably a perforated one) adapted to cause the circuit to be opened and closed at times when the current is naturally zero, as hereinafter described, and a receiving instrument adapted to make a visual record showing what pulses or semicycles of current have been transmitted and what suppressed.

The invention consists, further, in the specific combinations of devices recited in the claims at the end of this specification.

The generating devices are constructed or arranged to generate or produce an electromotive force and an alternating-current wave of preferably sine-wave form; but the wave of electromotive force or of current may depart in some degree from such form, as would be the case where the strength of current rises and falls with a greater or less degree of abruptness from zero to its maximum and back to zero than is the case with a true sine-wave. Any generating devices that will serve to produce upon the circuit a regular and uniform succession of waves gradually rising from zero to a maximum and then gradually decreasing to zero and reversing and increasing and decreasing in a similar way will answer the purpose of our invention. In this specification we use the term "alternating current" as meaning a current which consists of a succession of waves of this character. The most suitable and the preferred device for this purpose is a dynamo-generator whose natural form of varying electromotive force and current is a sine-wave. The recorder for the successive pulses or semicycles of the alternating current may be of any kind. For very high speeds it is preferable to use a receiver without inertia, like a photographic or chemical recorder of the well-known character. A form of photographic recorder suitable for the purpose and operated through the rotative action of the current upon a polarized beam of light will be hereinafter described.

The term "semicycle" is used herein in its ordinary sense to mean the portion of the alternating-current wave, whether positive or negative, from at or about one zero-point to at or about the next succeeding zero-point.

In the accompanying drawings, which form a part of this specification, Figure 1 illustrates, partially in diagram, the principle of the invention. Fig. 2 is a diagram of a part of Fig. 1. Fig. 3 is a graphic representation of the effect of the transmitter upon an alternating current. Fig. 4 represents in one form the record produced by the current indicated in Fig. 3. Fig. 5 is a diagrammatic representation of a commercial form of the improved system. Fig. 6 represents the transmission-tape. Fig. 7 represents a record produced by said tape.

In Fig. 3 we show graphically an alternating current the flow of which is interrupted in those portions of the wavy line which are dotted. The current-wave here indicated is not to be confounded with the wave of impressed electromotive force, but is to be taken as the wave of actual current flow in the circuit and which will be more or less displaced in phase from the wave of impressed electromotive force originated in the generator, the extent of displacement depending upon the rate of change of the alternating current or upon the frequency and also upon the natural properties of the circuit upon which the electromotive force is impressed, such as the resistance, the capacity, and inductance. Assuming that such an alternating current is flowing over the circuit with such frequency or rate of change as to produce a large difference in phase between it and the wave of impressed electromotive force, that some means for interrupting the circuit and again closing it are provided, and that by such means the circuit is interrupted at the instant the wave of current crosses the zero-line, or, in other words, at the instant of zero-flow of said current, the current which is at zero at the instant of interruption will remain zero thereafter (unless reëstablished) in circuits which have resistance and inductance alone. If the circuit be again closed at a time exactly corresponding to some point on the zero-line when the current would be again naturally zero, if it had been allowed to flow uninterruptedly, then it will resume its flow regularly undisturbed and in form corresponding to the form of impressed electromotive force and the electrical properties of the circuit. If the circuit had been closed at any other time than that at which it would have been zero had it been allowed to flow uninterruptedly, the current would not resume its flow according to the natural sine-wave for that circuit and electromotive force, but would flow as a succession of waves the semicycles of which are alternately smaller and larger than the normal wave, until after a number of alternations they will become uniform on both sides of the zero-line. For circuits having capacity in addition to resistance and inductance and under the conditions supposed as to time of make the form of current-wave is not exactly the same as above stated, but is somewhat modified. If the key had been opened at some other point than natural zero-point, when, therefore, a current is flowing a spark would be observed and time would be required for the current to fall to zero. By adopting this principle of making and breaking the circuit at the instants of natural zero in the propagation of current in the alternating-current wave for telegraphic transmission by the code system, as will be presently described—that is to say, by adjusting the make and break of circuit to the difference in phase between the impressed electromotive-force wave and the resultant current-wave for the particular circuit in use—not only is it possible to use comparatively large electromotive forces and currents on the line, but waves of much higher frequency may be employed than have been heretofore permissible in telegraphy, and using the code system a very high speed of transmission may be obtained by dealing with individual semicycles of such current according to a code plan. Moreover, the difficulties met with in high-speed systems of transmission from what is known as "tailing" are avoided and perfect clearness and legibility may be obtained in the recording instrument or receiver, which makes marks showing the varying current upon the circuit, the record being perfectly uniform and clear at very high speeds of transmission. On the other hand, if a high frequency alternating current be employed and the instant of make as well as of break be not adjusted with reference to the zero of the actual or natural current-flow—that is to say, with reference to the extent of the difference in phase between the waves of impressed electromotive force and the waves of current flowing—then there will follow a disturbance or mutilation in the strength or duration of the individual waves flowing, some being of less value and others of greater value for a number of waves after the establishment of the circuit, with the result of causing mutilation in the recorded marks and confusion in the received message.

To further explain the principle of our invention, we will describe a special case of an alternating-current dynamo and a circuit breaker or controller combined therewith and organized to cut out semicycles of the alternating current by making and breaking the circuit when the current is naturally zero.

G, Fig. 1, is an ordinary ten-pole alternating-current dynamo, and 14 a wheel geared by wheels 12 and 13 to run at one-fourth the speed of the armature. Wheel 14 has a conducting periphery upon which brushes 15 and 16 bear. The brushes and wheel are in the circuit from the dynamo-generator to the receiver, a special form of which, to be described, has a coil W. Assuming the periphery of wheel 14 to be divided into forty equal parts, it is obvious that each division corresponds in its peripheral extent to one semicycle of electromotive force produced by the generator, and if both brushes are continuously in contact with the wheel the alternating current will flow over the circuit in a continuous succession of connected semicycles joined to one another at times of zero-current. If, however, one or more sections or subdivisions of the wheel each equal to one-fortieth of its periphery be covered with paper or other insulation 17 underneath one of the brushes, as 15, the other brush being preferably in continuous engagement with the wheel and the brush be adjusted to ride onto and off from the insulation just as the current is changing from one semicycle to the next, the semi cycle or cycles represented by the sections covered will be suppressed and without any sparking or mutilation of the signals, even if the potential and frequency are high. In practice the brush 15 may be adjusted to this point by moving it slightly backward or forward around the circumference of the wheel to a distance corresponding to the difference in phase between the waves of impressed electromotive force developed in the generator and the resultant waves of current upon the circuit, such difference being dependent upon the rate of alternation and upon the electrical properties of the particular circuit. In practice one method of making this adjustment is by moving the brush either forward or backward until the sparking ceases, provided that the length of the paper strip is exactly the same as one of the unit divisions or an exact multiple thereof. This adjustment once made the brush is fixed in position and so remains. For illustration it is assumed that the paper or other insulation is applied to the wheel to suppress semicycles according to the Continental code of telegraphy, one semicycle being suppressed for a dot and two successive ones for a dash. This order or arrangement of suppression is also indicated in Fig. 3, where in the graphic representation of a wave certain semicycles of the wave are shown as dotted. This is carried out on the wheel, as indicated, by beginning at X and covering one space, then leaving one space uncovered, then covering two, and so on, so as to spell out the word "work" according to the Continental code, the sections, however, being left bare between the end of the word and the point X, proceeding in the direction of the revolution of the wheel.

One of the ways in which our invention may be actually employed in commercial-code telegraphy will be now described.

Referring to Figs. 5 and 6, we show a section of prepared paper in the form of a strip or sheet prepared with perforations to send a message. The message-tape 19 may be fed from a reel 20 between a pair of tension-rolls 21 and around a feed-wheel 22, gearing with the armature of the alternating-current generator, so that for one revolution of the armature the tape advances a fixed distance. A nipping-roll 23 may be used to keep the tape to the pulley and direct its delivery. Wheel 22 may be supplied with pins, if desired, to enter a series of feeding-perforations in the tape, the same as those in the Wheatstone transmitter. The contacts coöperating with the tape may consist of a wheel and brush, as in Fig. 1, or of two brushes—such as 24, Fig. 5—which are placed at an angle to the tape and meet through the perforations therein. These brushes may be made adjustable in the standard 25 and the standard made adjustable on its base, as indicated, so as to provide for an adjustment of the brushes longitudinally along the tape for the purpose of placing them in such a position relative to the perforations that they shall meet and separate on the edges of the perforations at the zero-points in the current-flow. In this way of using the tape the material of the tape operates to suppress semicycles in the same way as the patches or strips upon the wheel 14, the perforations providing for the transmission of semicycles and the material of the tape operating to cut off the flow of the alternating currents.

The paper may be prepared in any suitable machine capable of producing the perforations at regular intervals and of making the spaces between perforations exact multiples of the spaces covered by the perforations themselves.

Assuming that the generator produced five complete waves or ten alternations or semicycles of current for each revolution, the fixed length of paper which is for that one revolution fed between the brushes would be subdivided into ten spaces, each of which would correspond to one alternation or semicycle and would be taken as the unit of distance in perforating the tape. By then feeding the paper synchronously with the operation of the generator the parting and meeting of the contacts may be made to take place uniformly at zero-points of the wave of current. The required synchronous speed may be obtained from the alternating generator or from a motor run in unison therewith. When the instrument is first applied to the circuit, the brushes, even if placed in position to pass off from and onto the paper at the exact instant when the wave of alternating electromotive force developed by the generator and impressed upon the circuit is zero, will nevertheless generally not be in position to make and break circuit at the instant the actual current-flow over the circuit is zero, this being due to the fact that upon ordinary telegraphic circuit the stored energy modifies the impressed electromotive-force energy, so that the resultant current-wave is out of phase with the impressed electromotive-force wave. Hence the brushes should be moved along the tape or adjusted longitudinally thereof until the make and break coincide with the zero phase of the current, which may conveniently be done in many cases by adjusting until the spark disappears. This position of the brushes for zero-current is easily ascertained by trial and once ascertained remains fixed.

In Fig. 6 the tape is shown as perforated for the message "One wire work of ten," perforations being made according to the continental code and one semicycle being suppressed for a dot and two successive ones for a dash. Dots and dashes are separated by one semicycle, letters by two, and words by three.

As merely illustrative of a form of receiver which may be used in carrying out our invention we show one in which the record is made photographically.

S, Fig. 5, represents a screen through which a ray of light from any suitable source is admitted to a polarizing-prism P, whence it passes through some medium T, wherein under the influence of a current flowing in a coil W the plane of the polarization of the ray of light will be rotated. In the path of the beam as it emerges from this medium is placed the analyzing-prism A, which in setting up the instrument to work in the "crossed or normally dark position" is rotated on its horizontal axis until the light is completely extinguished during the cessation of current in coil W. When current flows through the coil, the plane of polarization of the beam is rotated, thus causing the beam to emerge from A, pass through the lens L, and fall upon a sensitized recording-surface in the form of a tape D, as in Fig. 1, or in the form of a tape D', Fig. 5, which may be run through a bath of developer 27 and then through a bath of fixer, as at 28, whence it may be delivered by rolls 29. These rolls may be, if desired, heated, so as to dry the tape as it is delivered. The tape is shown as passing from a reel 30 over a roll 31 and vertically downward into the bath 27, before reaching which it receives the light-beam. All these parts may be placed in a dark case, as indicated, and a slit provided for the admission of the beam of light on the lens, or the entire receiver may be in a dark room, as desired.

In the circuit of the coil W the alternating current is made to flow directly or indirectly in any required manner, so in Fig. 1 it is operated directly in the line-circuit E E, or, as in Fig. 5, it may be operated in a circuit E', derived from the line-circuit E, through any suitable transformer, as indicated at I. In this way any number of receivers may be operated over the same main line, a second branch thereof being indicated in dotted lines at E². It is obvious that the device for cutting out the semicycles might be placed in the secondary circuit with the receiver, as by putting a transformer across the mains, Fig. 1, just outside the binding-posts of the generator G. With this form of receiver the effect upon the sensitized plate or film produced by modifying the alternating current in the manner shown in Fig. 3 to cut out the semicycles in the order shown will be as indicated in Fig. 4. The close succession of marks regularly recurring without interruption, as indicated in Fig. 4, represents the effect produced by the alternating current when allowed to flow uninterruptedly.

If a record be received upon the disk D, there would for each rotation of the wheel 14, if unprovided with the insulation-pieces 17, be forty light-affected spots upon the plate B, arranged thereon as indicated at 11. At points corresponding to the position of the pieces 17 the spots corresponding to the semicycles suppressed will fail to appear on the disk, and there will be a blank space.

The record for the section of prepared message 19 of Fig. 5 is graphically indicated in Fig. 7 when the message is received by the photographic instrument just described.

The form or construction of the transmitter is obviously capable of great variation, and it is also obvious that the semicycles may be suppressed or permitted to flow according to any predetermined plan. It is also plain that the receiver may be of other kinds or forms capable of making a record which will show which pulses have been suppressed and which transmitted—as, for instance, those affected by changes in polarity and those popularly known as "electrochemical" receivers, in which a chemically-prepared strip of paper is discolored by the passage of the current.

The high potentials which it is possible to employ with this system of transmission make it practicable to employ many other forms of receivers even with a very high speed of transmission.

By our system of telegraphy many thousands of words per minute may be transmitted and received.

It is obvious that instead of suppressing or cutting out semicycles to represent characters and allowing the transmitted semicycles to produce spaces portions of the current may be suppressed for spaces and the portions transmitted be made to produce marks or recorded signs.

The invention claimed is—

1. The herein-described improvement in automatic telegraphy consisting in impressing the characters of a code upon an alternating electric current, gradually rising and falling in strength, by adjusting the makes and breaks of circuit to the difference in phase between the impressed electromotive-force wave and the resultant current-wave so as to open the circuit at times when the current is naturally zero and to close the circuit at times when the current would have been zero had it been allowed to flow uninterruptedly and thus to transmit or suppress determinate semicycles of the current in definite order or succession in accordance with such code, and making at the receiving end of the line a visual record showing each pulse transmitted or suppressed, as and for the purpose described.

2. In a transmitting apparatus for code telegraphy, the combination substantially as described, of means for generating an electromotive force gradually rising and falling in value, as described, a transmitter operating synchronously therewith and having a prepared tape or sheet and transmitting-stylus adjusted, as described, with reference to the difference in phase between the impressed electromotive-force wave and the resultant current-wave so as to cause the circuit to be opened and closed when the current is naturally zero, as described, and a receiving instrument adapted to make a visual record of the individual pulses transmitted and suppressed.

3. In a transmitter for telegraphy, the combination with an alternating-current generator producing an electromotive force gradually rising and falling in value, as described, and the electric circuit traversed by alternating electric current flowing from said generator, of circuit-controlling devices operated synchronously with said generator and comprising a tape or sheet in the working circuit over which said alternating currents flow and spaced or adjusted as described with reference to the difference in phase between the impressed electromotive-force wave and the resultant current-wave so as to open the circuit at or about the time the current flowing over said circuit is naturally zero and to close the circuit at times when the current would have been zero had it been allowed to flow without interruption.

4. The combination, substantially as described, in a transmitter for code telegraphy, of a dynamo-generator and a transmitting instrument operated synchronously with said generator and having a transmitting-stylus and perforated tape or sheet organized and spaced or adjusted as described with reference to the difference in phase between the impressed electromotive-force wave and the resultant current-wave so as to stop the flow of the alternating currents over the circuit at instants when the current is zero and to cause the flow to be resumed at instants when the current would be naturally zero had its flow not been interrupted, and a receiving instrument adapted to record individual semicycles of the current, as and for the purpose described.

5. In a system of telegraphy, the combination with means for generating a varying electromotive force of sine-wave form, of a prepared tape adapted to suppress and transmit definite or predetermined pulses of the varying current produced by said electromotive force by makes and breaks of circuit adjusted with reference to the difference in phase between the varying electromotive-force wave and the resultant current-wave so as to interrupt and reëstablish circuit when the current is naturally zero, as described, and a receiving apparatus adapted to make a record of the individual pulsations so as to show the order and relation of the transmitted and suppressed pulses.

6. The combination with an electric generator developing an alternating electromotive force gradually rising and falling in value, of a transmitting-stylus and a perforated tape movable at a speed synchronous with that of the generator for controlling the flow of currents developed by said electromotive force over a circuit, said perforations being so arranged and the stylus so adjusted with reference to the difference in phase between the alternating electromotive-force wave and resultant current-wave that complete semicycles will be transmitted or suppressed by makes and breaks of circuits at instants when the current is naturally zero as set forth, and a receiver adapted to respond to each pulsation, as and for the purpose described.

7. The combination with a continuously-operating alternating generator of electromotive force gradually rising and falling in value, of means for controlling the circuit adjusted as described with reference to the difference in phase between the alternating electromotive-force wave and the resultant current-wave so as to transmit individual semicycles of the current either positive or negative, beginning and ending at instants when the current is naturally zero as described, and in any order or succession, and a recording apparatus responsive to the individual semicycles whether of the same or of the opposite polarity successively.

8. The combination with an alternating electromotive-force generator developing an electromotive force gradually rising and falling in value and the electric circuit connected thereto, of a circuit-breaking tape or sheet and transmitting-stylus in said circuit spaced and adjusted, as described, with reference to the difference in phase between the alternating electromotive-force wave and the resultant current-wave so as to open the circuit when the current is naturally zero, and to close the circuit when the current would have been zero had it been allowed to flow without interruption.

9. The combination with an alternating electromotive-force generator developing an electromotive force gradually rising and falling in value, of circuit making and breaking appliances operating synchronously therewith and comprising a perforated tape or sheet and electrical contacts adapted to meet through the perforations, said appliances being so organized and adjusted with reference to the difference in phase between the alternating electromotive-force wave and its resultant current-wave that complete determinate semicycles beginning and ending at the times of zero current, as described, will be caused to flow over the circuit.

10. The combination in a telegraph of a dynamo-generator of alternating electromotive force of sine-wave or approximately sine-wave form, transmitting apparatus organized and adjusted with reference to the difference in phase between the alternating electromotive-force wave and the resultant current-wave so as to cause determinate semicycles of current in any desired order or relation to flow over the circuit beginning and ending when the current is naturally zero, as described, and a receiving apparatus adapted to record the semicycles of current individually.

11. The combination with means for producing an alternating electromotive force and means for suppressing a definite semicycle or semicycles thereof, organized or adjusted with reference to the difference in phase between the impressed electromotive-force wave and the resultant current-wave so as to cause a semicycle or semicycles of current to flow beginning and ending when the current is naturally zero, of a recorder of the alternations comprising means for producing a beam of polarized light and for rotating said beam by the action of the alternating current, and means for photographing the succession of spots of light corresponding to the successive semicycles of said current.

Signed by ALBERT C. CREHORE, at Hanover, in the county of Grafton and State of New Hampshire, this 17th day of October, A. D. 1896.

ALBERT C. CREHORE.

Witnesses:
HENRY J. WESTON,
LORENZO D. GOVE.

Signed by GEORGE O. SQUIER, at Hampton, in the county of Elizabeth City and State of Virginia, this 20th day of October, A. D. 1896.

GEORGE O. SQUIER.

Witnesses:
S. E. BICKFORD,
J. C. PUTTEN.